US009671768B2

(12) United States Patent
Lo et al.

(10) Patent No.: US 9,671,768 B2
(45) Date of Patent: Jun. 6, 2017

(54) SMART BUILDING MANAGEMENT SYSTEM AND MULTI-BUILDING MANAGEMENT SYSTEM

(71) Applicant: DELTA ELECTRONICS, INC., Taoyuan County (TW)

(72) Inventors: Tien-Szu Lo, Taoyuan County (TW); Meng-Seng Chen, Taoyuan County (TW); Hsueh-Hsing Chao, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 483 days.

(21) Appl. No.: 14/282,018

(22) Filed: May 20, 2014

(65) Prior Publication Data

US 2015/0088312 A1 Mar. 26, 2015

(30) Foreign Application Priority Data

Sep. 26, 2013 (TW) .............................. 102134683 A (51) Int. Cl.
*G05B 15/00* (2006.01)
*G05B 15/02* (2006.01)

(52) U.S. Cl.
CPC ...... *G05B 15/02* (2013.01); *G05B 2219/2642* (2013.01)

(58) Field of Classification Search
CPC .................. G05B 15/02; G05B 2219/2642
USPC ....................................................... 700/275
See application file for complete search history.

(56) References Cited

U.S. PATENT DOCUMENTS

| 2003/0167238 A1* | 9/2003 | Zeif .................. G05B 23/0267 705/400 |
| 2007/0233323 A1* | 10/2007 | Wiemeyer .............. G05B 15/02 700/276 |
| 2008/0242945 A1* | 10/2008 | Gugliotti ................ G05B 15/02 600/300 |

(Continued)

FOREIGN PATENT DOCUMENTS

CN 102193544 9/2011

OTHER PUBLICATIONS

Office Action dated Sep. 12, 2016 from corresponding application No. CN 201310453024.8.

*Primary Examiner* — Robert Fennema
*Assistant Examiner* — Jigneshkumar Patel
(74) *Attorney, Agent, or Firm* — Hauptman Ham, LLP (57) ABSTRACT

A smart building management system manages a building for providing smart analyses and strategies. The management system connects with plural hardware devices in the building and receives the data and statuses replied by the hardware devices, and further analyzes the maintenance statuses and energy consumption statuses of the hardware devices. Then the management system gathers the statistics of the total energy consumption statuses of the building according to the energy consumption statuses of the hardware devices. The management system receives the requests of users through a graphic user interface. The management system plans an energy-saving strategy based on the maintenance statuses of the hardware devices and the requests of users, and adjusts the hardware devices depending on the energy-saving strategy. Therefore, the total energy consumption statuses of the building meet an energy-saving target set by users in advance.

17 Claims, 7 Drawing Sheets

(56) References Cited

U.S. PATENT DOCUMENTS

| | | | |
|---|---|---|---|
| 2009/0210726 A1* | 8/2009 | Song | G06F 11/3006 713/300 |
| 2010/0324962 A1* | 12/2010 | Nesler | G01R 21/133 705/7.36 |
| 2011/0231320 A1* | 9/2011 | Irving | G06Q 30/00 705/80 |

\* cited by examiner

SMART BUILDING MANAGEMENT SYSTEM AND MULTI-BUILDING MANAGEMENT SYSTEM

BACKGROUND OF THE INVENTION

1. Field of the Invention

The present invention generally relates to a management system, more particularly to a smart building management system that manages a building and a multi-building management system that simultaneously manages a plurality of smart building management systems.

2. Description of the Related Art

Conventional management systems for a general building mostly focus on automatic managements, such as automated access control systems, security systems, parking systems, monitoring systems, etc.

Conventional energy-saving systems are normally building oriented, which are not user friendly. When an administrator sets up an energy-saving target, such as a monthly amount limit, an energy-saving system will manage the building based on the energy-saving target directly, and ignores the real comfort of occupiers in the building. For example, when a monthly amount is going to approach the energy-saving target, the operation time of air conditioners or the intensity of air conditioners will be limited; otherwise, users are free to operate the electronics.

As aforesaid, the conventional energy-saving systems do not put more focuses on satisfying demands from individuals (such as floor A being too hot, floor B being too cold, etc.). This kind of energy-saving system only considers how to save energy, and its main purpose is to lower down an energy usage rate, but without taking account of the requests from users for environmental comfort. In other words, energy consumption is lowered down at the expense of user's comfort. For example, the conventional energy-saving system will set the temperature at 28 degrees in Celsius for saving power, and users will feel uncomfortable even power is saved.

Moreover, the energy saving efficiency also relies on the condition of equipment in the building, such as performance of air conditioners or wattage of lamps. The user's requirement still cannot be met or the energy-saving target still cannot be achieved by user's setting if the condition of equipment in the building is bad.

For example, if the air conditioner is old, the room temperature may not be down whatever the air conditioner is regulated, and then the users' expect for cooling is hardly satisfied. Further, if the wattage of lamps is high, a large amount of power consumption is caused and the object of saving energy cannot be fulfilled, even a reduced operation time (for example 4 hours per day) is actually set. Certainly, the energy-saving target will not be achieved.

SUMMARY OF THE INVENTION

The present invention is to provide a smart building management system and a multi-building management system. The present invention can simultaneously manage the requests of users, the maintenance statuses of the hardware devices of one or more buildings, and the energy-saving targets of one or more buildings.

Accordingly, the present invention is to manage a building in order to provide smart analyses and strategies. The management system connects with a plurality of hardware devices in the building and receives data and statuses replied by the hardware devices, and further analyzes the maintenance statuses and energy consumption statuses of the hardware devices. Then the management system gathers the statistics of the total energy consumption statuses of the building according to the energy consumption statuses of the hardware devices. The management system receives the requests of users through a graphic user interface. The management system plans an energy-saving strategy based on the maintenance statuses of the hardware devices and the requests of users, and adjusts the hardware devices depending on the energy-saving strategy. Therefore, the total energy consumption statuses of the building conform to an energy-saving target set by users in advance.

Compared to the related arts, the advantages of the present invention are to consider the three aspects of the users' requests, the statuses of the hardware devices, and the achieved energy-saving target when managing the energy consumption statuses of the building. Therefore, the present invention may not set an energy-saving target that cannot be achieved by the hardware devices; and the present invention may not lower down the energy consumption without considering the real comfort of users.

To consider the users with different statuses in the building, a plurality of authority limits of users are set to provide different functions and data to corresponding users.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
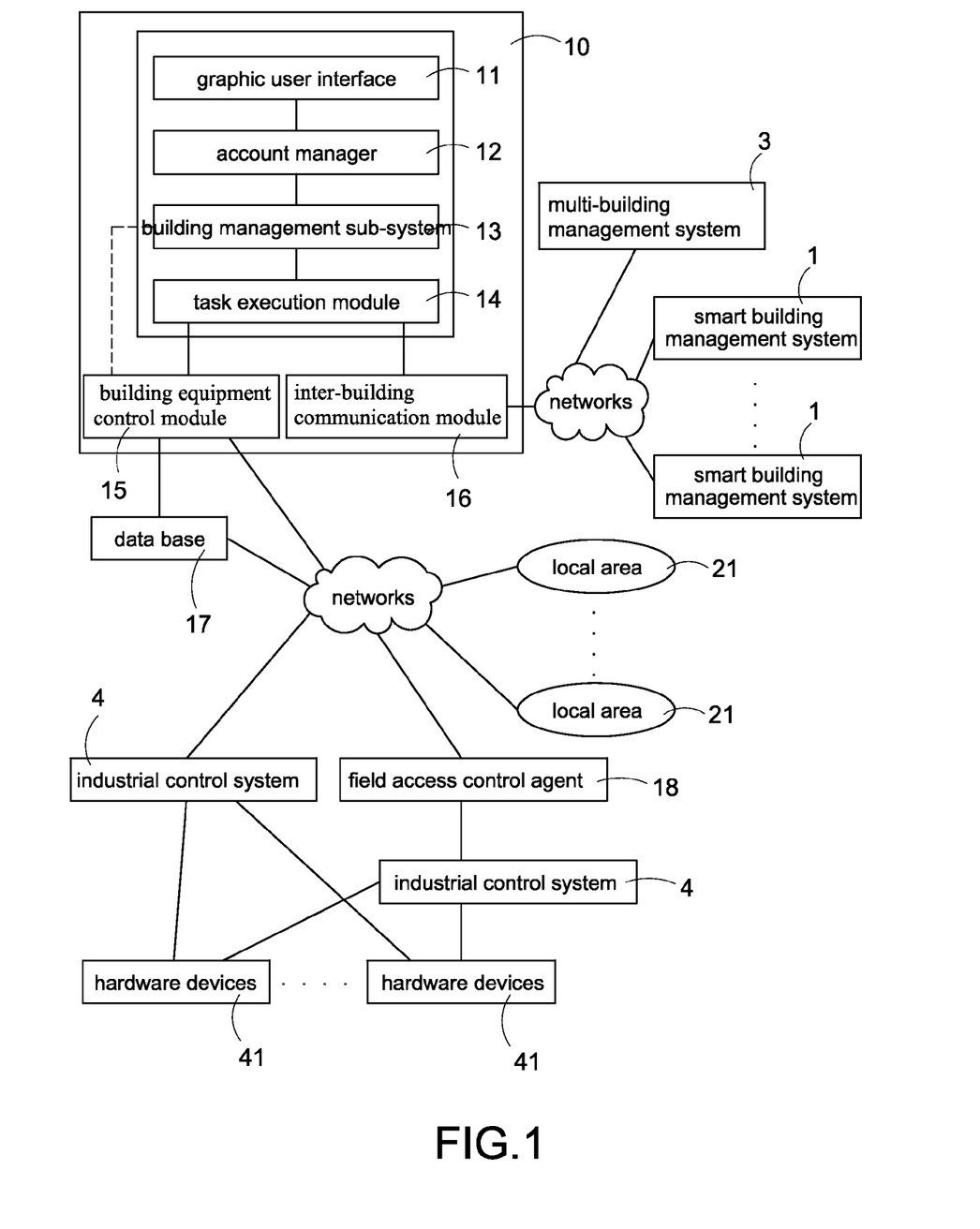
FIG. 1 illustrates a block diagram of a smart building management system according to a first embodiment of the present invention.
Figure 2:
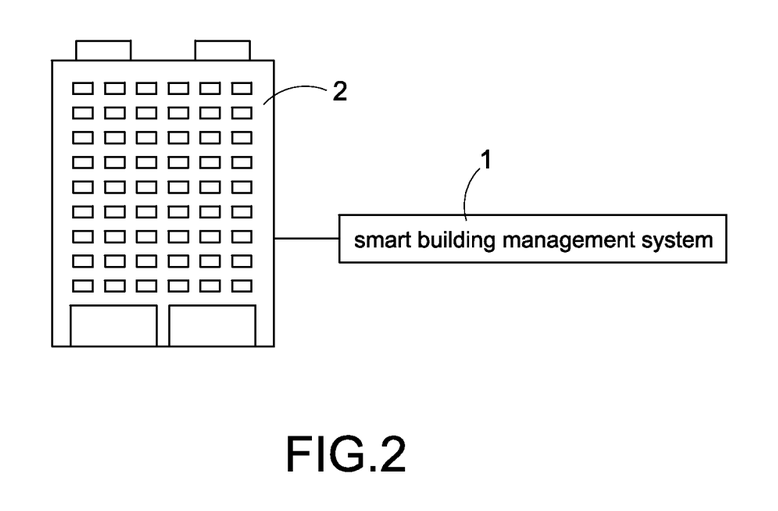
FIG. 2 illustrates a schematic structural view of a smart building management system according to a first embodiment of the present invention.

Please refer to FIG. 1, which illustrates a block diagram of a smart building management system according to a first embodiment of the present invention. The present invention discloses a smart building management system (BMS) 1, which mainly manages a building 2 (as shown in FIG. 2). The BMS 1 of the building 2 can further communicate with other BMSs 1 via networks for exchanging data among different buildings 2.

The BMS 1 is accomplished by software unit and hardware units. As shown in FIG. 1, the software unit of the BMS 1 comprises a system core module 10 that has a graphic user interface (GUI) 11, an account manager 12, a building management sub-system 13, a task execution module 14, a building equipment control module 15, and an inter-building communication module 16, etc. The hardware units of the BMS 1 comprise a database 17, a field access control agent 18, etc., and connect with the system core module 10 through networks.

Users in different statuses, such as householders, tenants, administrators, owners, etc., use the building 2. The account manager 12 provides the registrations of the accounts for the users, and sets up an authority limit of every single account according to the status of each user. The graphic user interface 11 connects with the account manager 12 in order to accept the log-in of every single account, and receives requests from a user within the authority limit of the user account. The graphic user interface 11 can provide functions and information of the authority limit to the user.

For example, the householders only focus on quality of service (QoS) and comfort. Therefore, the BMS 1 only lets the householders ask for general demands such as too hot or too cold, and etc., and the information about the energy consumption, statuses of equipment maintenance, etc. may not be necessary to open to the householders for checking.

However, if the user is the administrator or owner, except for the quality of service and comfort, the energy efficiency, maintenance efficiency, energy consumption and benchmark with other building, comparison of rental payments with expense costs of the building 2, etc. may be provided by the BMS 1.

The building management sub-system 13 connects with the graphic user interface 11 (or through the account manager 12 to connect with the graphic user interface 11), and provides corresponding functional options on the graphic user interface 11 according to the authority limit of a user account (will be described below in detail), for instance, a field for user inputting requests, or a field displaying an total energy consumption of the building 2, etc. The user is able to trigger the building management sub-system 13 on the graphic user interface 11 in order to input the above-mentioned requests or check the requesting information.

The building management sub-system 13 also connects with the building equipment control module 15 (or through the task execution module 14 to connect with the building equipment control module 15). The building equipment control module 15 connects with one or more industrial control systems (ICS) 4 in the building 2 through networks. In practice, the building equipment control module 15 connects with a plurality of hardware devices 41 in the building 2 through the ICS 4. For the embodiment, the ICS 4 can be an heating, ventilation and air conditioning (HVAC) system, a gas system, an electrical system, an access control system, a water supply and drainage system, a lighting system, a closed-circuit television (CCTV) system, a fire system, an elevator system, and various sensing systems, but not limited thereto.

For the embodiment, the BMS 1 is through the building equipment control module 15 to connect with the plurality of hardware devices 41 by way of the ICS 4, wherein the hardware devices 41 are disposed in the same area or are respectively disposed in different areas of the building 2, such as a first floor, a second floor, a third floor, or a lobby, a restroom, office A, office B of a certain floor, etc.

The hardware devices 41 reply data, such as the current temperature of the HVAC system, the sensing data of the sensing system, etc., generated or searched by themselves, and device conditions, such as the life of the elevator system, the latest maintenance time of the water supply and drainage system, etc., to the building equipment control module 15 through networks. Further, the hardware devices 41 directly write the data into the database 17, or write the data into the database 17 through the ICS 4. The BMS 1 is through the building equipment control module 15 to connect with the database 17, hence the account manager 12, the building management sub-system 13, the task execution module 14, and the inter-building communication module 16 of the BMS 1 can access the database 17 via the building equipment control module 15. In other words, the building equipment control module 15 is used to be a connecting interface among the BMS 1 and the hardware devices 41.

The building management sub-system 13 obtains the data and the device conditions replied by the hardware devices 41 through the database 17 and/or the building equipment control module 15. Accordingly, the building management sub-system 13 analyzes the maintenance statuses of the hardware devices 41 in order to determine whether the maintenance or displacement of the hardware devices 41 is necessary, and analyzes the statuses of the total energy consumption of the building 2. For example, the sum of the energy consumption of the hardware devices 41 can be as the total energy consumption of the building 2. If the authority limit of a user account, such as a building owner account, allow to read the above data, the building management sub-system 13 displays the maintenance statuses of the hardware devices 41, the total energy consumption of the building 2, etc. on the graphic user interface 11 based on the requests from the user for checking.

The task execution module 14 connects with the building management sub-system 13 and the building equipment control module 15, and accesses the database 17 through the building equipment control module 15. The task execution module 14 has a plurality of execution procedures for different applications. When the building management sub-system 13 wants to execute a task, for example actively checking the statuses of the hardware devices 41 or adjusting the energy consumption of the hardware devices 41, the task module 14 can be designated.

Specifically, the building management sub-system 13 may build up a plurality of tasks that are achieved one by one for the total energy consumption of the building 2 to fit energy-consumption targets set by the users. In other words, the building management sub-system 13 is able to build up the tasks according to requests from the users and the maintenance statuses of the hardware devices 41. The task execution module 14 schedules the tasks, and executes the tasks according to the schedules. The tasks can be executed to modulate the hardware devices 41, such as turning on and off the drainage system, raising the temperature of the HVAC system, reducing the motor speed or brightness of lamps, etc. Therefore, under consideration for the statuses of the present hardware devices 41, the users' requests may be achieved as soon as possible, and meanwhile, the total energy consumption of the building 2 fits the users' requests, such as the energy consumption targets set by the administrator or the owner.

As shown in FIG. 1, the BMS 1 directly connects and communicates with the ICS 4 via networks in order to control the hardware devices 41 through the ICS 4. Further, the BMS 1 connects with the field access control agent (hereinafter referred to the control agent) 18 via networks, and also connects with the ICS 4 and the hardware devices 41 through the control agent 18. For the embodiment, the control agent 18 is an agent interface of the building equipment control module 15 in order to represent the BMS 1 to communicate with the ICS 4 and the hardware devices 41. Hence different kinds of ICSs 4 are effectively organized and managed.

It is to be noted that in case of the amount of the ICSs 4 in the building 2 is excessive, using only one single building equipment control module 15 connecting with all of the ICSs 4 may cause heavy loading to the building control module 15 (or the system core module 10). Therefore, the present invention sets one or more control agents 18 to replace the building equipment control module 15 (or the system core module 10) to communicate with the ICSs 4, so as to send the control commands of the BMS 1 and to receive the data replied by the ICSs 4 and the hardware devices 41 through the ICSs 4. Hence, the total loading of the BMS 1 is reduced and the BMS 1 is more stable.

Figure 3:
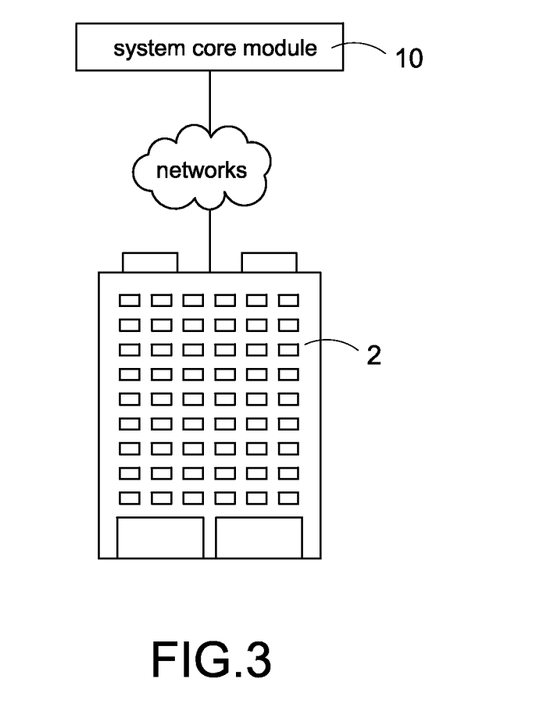
FIG. 3 illustrates a schematic structural view of a smart building management system according to a second embodiment of the present invention.
Figure 6:
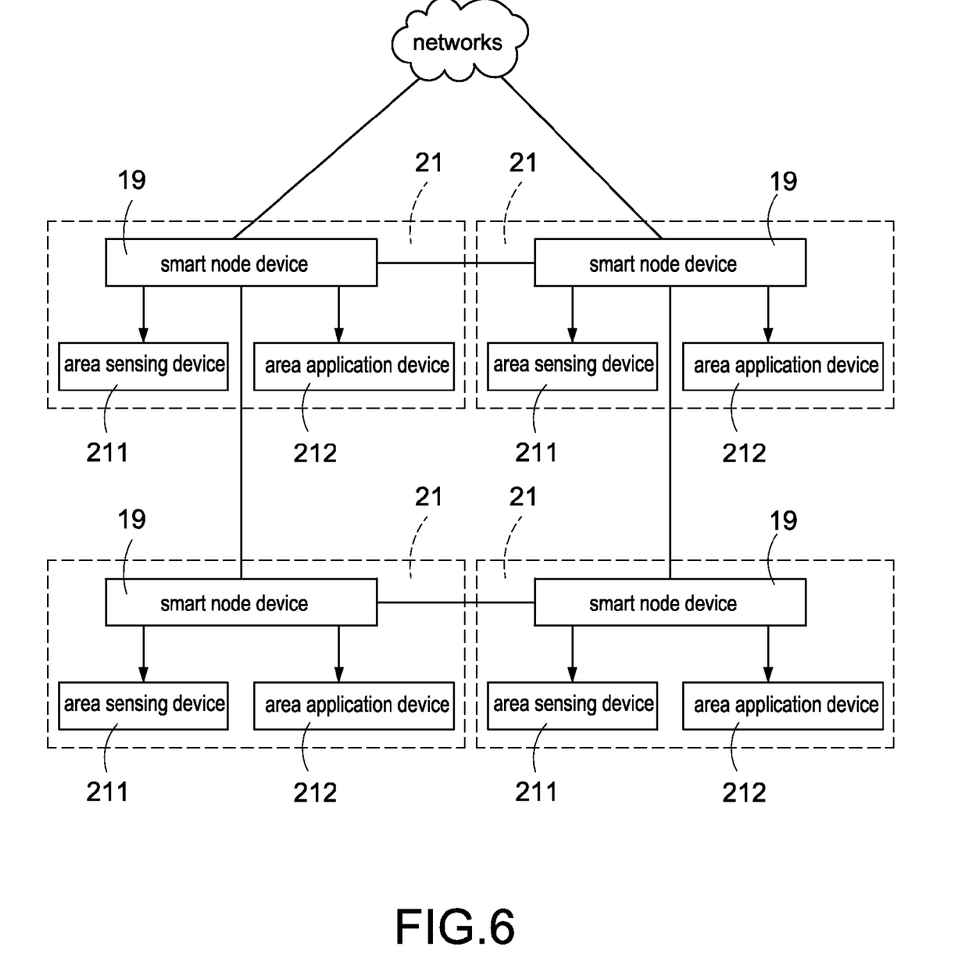
FIG. 6 illustrates a schematic view of a local area according to the first embodiment of the smart building management system of the present invention.

Please refer to FIG. 2 and FIG. 3 together, which illustrate a schematic structural view of the smart building management system according to the first embodiment of the present invention and a schematic structural view of the smart building management system according to a second embodiment of the present invention. For the embodiment in FIG. 2, the BMS 1 is directly disposed in the building 2 for convenient management. However, as shown in FIG. 3, the software unit, namely the system core module 10, is disposed in the clouds. The software unit then connects with the hardware units in the building 2, such as the database 17, the control agent 18, and other hardware (for example, a smart node device 19 as shown in FIG. 6), etc. The advantage of the embodiment is to facilitate administrators to update or alter the system core module 10, making the maintenance of the BMS 1 more flexible. For instance, the building 2 is in Taiwan, but the system core module 10 can be in a server in USA, and the users in the building 2 can log in the system core module 10 via networks. However, the above descriptions are only preferred embodiments of the present invention, but not limited thereto.

Figure 4:
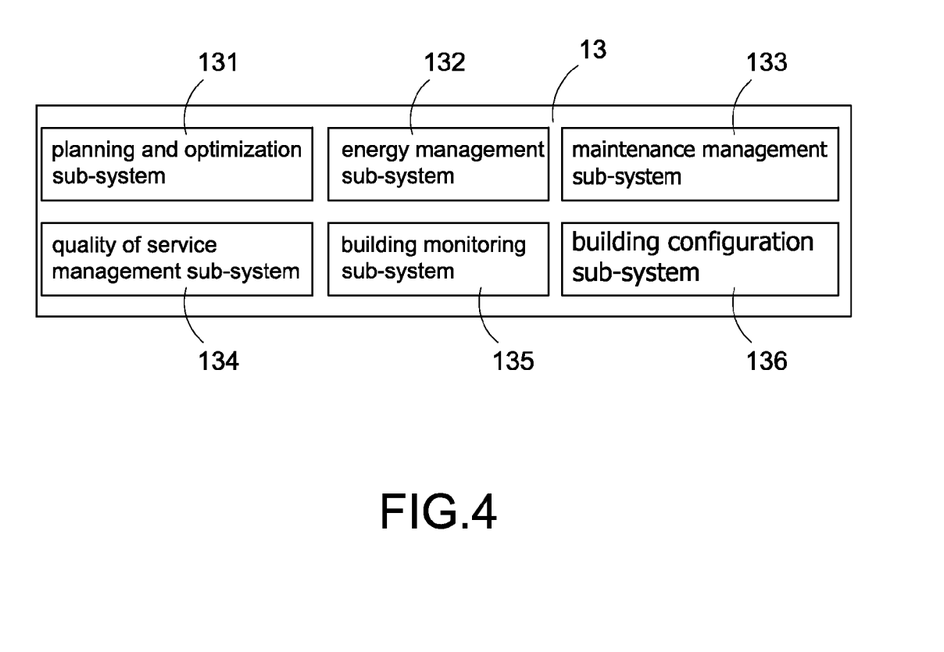
FIG. 4 illustrates a block diagram of a building management sub-system according to the first embodiment of the smart building management system of the present invention.

Please refer to FIG. 4, which illustrates a block diagram of the building management sub-system according to the first embodiment of the smart building management system of the present invention. As shown in FIG. 4, the building management sub-system 13 comprises a planning and optimization sub-system 131 (hereinafter referred to the optimization sub-system 131), an energy management sub-system 132, a maintenance management sub-system 133, a quality of service management sub-system 134 (hereinafter referred to the QoS management sub-system 134), a building monitoring sub-system 135 and a building configuration sub-system 136. The sub-systems 131-136 are shown on the graphic user interface 11 through user's input menu buttons (not shown in the figures). When a user logs in, the graphic user interface 11 shows available sub-systems as options according to the authority limits of the user for the user to trigger the available sub-systems. However, the amounts and functions of the sub-systems 131-136 may vary because of different buildings 2. For the embodiment, the graphic user interface 11 may be logged in through different ways, such as through webs or applications, and shows the corresponding functions of the sub-systems 131-136.

The energy management sub-system 132 collects the operating timing of the hardware devices 41, and analyzes the energy consumption and loading statuses of each of the hardware devices 41 in order to gather the statistics of the total energy consumption statuses of the building 2. The energy management sub-system 132 requests the hardware devices 41 directly (or through the ICS 4) or accesses the database 17 for obtaining above data.

For example, the energy management sub-system 132 can collect the energy consumption statuses of the hardware devices 41 in each area of the building 2 for analysis, and further predict future possible energy consumption of each area. More, the using time, such as 30 minutes or one hour, and the statuses of the hardware devices 41, such as being operated under low-power mode or high-power mode, can be analyzed as well. At the same time, a loading alert can be set to each hardware device 41; for example, a loading alert appears after one or two more hours in operation. More, the energy management sub-system 132 uses the statistics to predict the maximum energy consumption per day or month in order to analyze whether the energy consumption complies with a contract volume. Through above data, the energy management sub-system 132 can analyze the energy consumption data and the loading statuses of the hardware devices 41.

The maintenance management sub-system 133 collects the down time data, the maintenance time, the standard of process for maintenance flows, etc., and receives the data and the equipment statuses replied by the hardware devices 41 so as to analyze the maintenance statuses of the hardware devices 41. When the hardware devices 41 need to be maintained, the maintenance management sub-system 133 may have a notice shown on the graphic user interface 11, and a maintenance person will be informed by the notice on the graphic user interface 11, or a message, an e-mail sent from, or apps installed on a smart phone. The maintenance management sub-system 133 requests the hardware devices 41 directly (or through the ICS 4) or accesses the database 17 for obtaining above data.

In addition to inform maintenances under certain situations, the maintenance management sub-system 133 will be responsible to the routine notices and records of the hardware devices 41. Such maintenances can be proceeded according to the standard of process (SOP). It is to be noted that the maintenance management sub-system 133 obtains users' complains via the QoS management sub-system 134 and the database 17. For example, when a user often complains that an HVAC in a certain area does not work properly, the maintenance management sub-system 133 can optionally inform a maintenance person to check the condition of the HVAC.

Further, the maintenance management sub-system 133 connects with the building monitoring sub-system 135 for obtaining the operation statuses of the hardware devices 41 in time, and therefore a maintenance notice will be quickly issued. For example, when the building monitoring sub-system 135 knows the hardware devices 41 are not working properly, the maintenance management sub-system 133 immediately issues a maintenance notice to the maintenance person.

The QoS management sub-system 134 gathers statistics of the requests from the users, and analyzes a progress and quality of a service provided by the BMS 1 for the requests. Specifically, a user can log in the BMS 1 to ask for general requests, such as replacing malfunctioned lamps, adjusting environmental temperature because of too hot or too cold, a long waiting time for elevator, etc. For the embodiment, the QoS management sub-system 134 gathers statistics of the above-mentioned requests from the users, and analyzes the progress and quality of the service in process.

Generally speaking, a householder has an authority limit for issuing requests only, but will not be informed of the statistical result; however, if a user registers to enter into the BMS 1 with the status of the administrator or owner, the statistical result of the QoS management sub-system 134 can be shown through the graphic user interface 11. For example, the temperature of a certain area is always lower than users' expect, but other adjacent areas do not have such problem, complains from users are not solved or processed too slow, etc. Through aforesaid approach, the entire service quality of the building 2 will be improved.

The optimization sub-system 131 connects with the energy management sub-system 132, the maintenance management sub-system 133 and QoS management sub-system 134. The optimization sub-system 131 obtains the energy consumption of the hardware devices 41 from the energy management sub-system 132 in order to gather the statistics of the total energy consumption of the building 2. The optimization sub-system 131 obtains the maintenance statuses of the hardware devices 41 via the maintenance management sub-system 133. The optimization sub-system 131 obtains the requests from users through the QoS management sub-system 134. The optimization sub-system 131 executes the optimization of the BMS 1 according to above data, and plans at least one energy-saving strategy based on an optimization result.

Specifically, the energy-saving strategy comprises the plurality of tasks, such as adjusting, maintaining, replacing the hardware devices 41, updating or altering the software unit, etc. Therefore, after the building 2 operating the energy-saving strategy, the tasks of maintaining and updating the hardware devices 41 can be executed to satisfy the requests from the users, and the energy consumption of the building 2 meets a predetermined energy-consumption target at the same time.

When the administrator or owner logs in the BMS 1, an energy-consumption target of the building 2 is able to be set. For example, next year will reach the target of lowering 10% power consumption, 5% water consumption and 15% Gas consumption. Then the optimization sub-system 131 may analyze general requests from the users, the maintenance statuses of the hardware devices 41, and the total energy consumption of the present building 2 to determine whether the set target can be reached. If yes, the optimization sub-system 131 will plan the energy-saving strategy to generate plural tasks for execution.

When the optimization sub-system 131 determines that the target is hardly to reach, the graphic user interface 11 may issue a notice to ask the administrator or owner to reset the target. For example, if lowering 20% power consumption is a target of the building owner and another request from the users is that the HVAC system will have continuous operations for 24 hours, the optimization sub-system 131 may request the owner to reset the energy-saving target.

The above energy-saving strategies can be as a lighting system energy-saving strategy, an HVAC system energy-saving strategy, an elevator system energy-saving strategy, a water supply and drainage system energy-saving strategy, etc., but not limited thereto. Each strategy further comprises a hardware replacing strategy and a software replacing strategy.

The hardware replacing strategy is to estimate a cost to replace the hardware devices 41 and a saving benefit after replacing the hardware devices 41, such as how much energy being saved after replacing the present hardware devices. The software replacing strategy is to analyze the present application statuses of the building 2 according to the historical data of the hardware devices 41, so as to provide a software improvement proposal, and then the software replacing strategy also estimates the cost for the software improvement proposal and estimates a resulting benefit. The software improvement proposal, for example, is to plan the operating timing of the hardware devices 41 so as to reduce an idle time of the hardware devices 41, such as turning off all the hardware devices 41 when not in the working hours, or updating the firmware in the hardware devices 41 so as to enhance the effect of saving energy of the hardware devices 41.

The building configuration sub-system 136 connects with the optimization sub-system 131, and records and manages an amount, a sort, an installment position, etc. of the hardware devices 41 in the building 2. Specifically, after new hardware devices 41 are set up, or the old hardware devices 41 are replaced or moved to a new location, the administrator can log in the BMS 1 to trigger the functions of the building configuration sub-system 136, in order to register the new information of the hardware devices 41 to the building configuration sub-system 136. The administrator may update the information of the old hardware devices 41 through the building configuration sub-system 136. Therefore, the BMS 1 will effectively manage the all hardware devices 41 of the building 2, so as to accurately estimate the energy consumption.

The building monitoring sub-system 135 connects with the optimization sub-system 131 and the building configuration sub-system 136, in order to monitor the operating statuses of the hardware devices 41 in time, and issue a warning message while in abnormal operations or irregular situations. More specifically, the building monitoring sub-system 135 directly connects with an alarm, and the alarm is activated when the hardware devices 41 are in the abnormal operations, so that the administrator will be notified as soon as the alarm is working. Moreover, the building monitoring sub-system 135 can show a warning message only on the graphic user interface 11 for the administrator to check after logging in.

It is worth to note that the building monitoring sub-system 135 yet communicates with other systems, such as an access control system, a security system, a fire system, etc., of the building 2, in order to be as a bridge of communications among systems. For example, when the building monitoring sub-system 135 receives a message from the access control system, and finds out that a card reader of the building 2 at an entrance cannot transmit signals back, the building monitoring sub-system 135 may request the security system to turn a camera toward an area where the card reader is located, in order to shoot the whole area for recording evidences.

Figure 5:
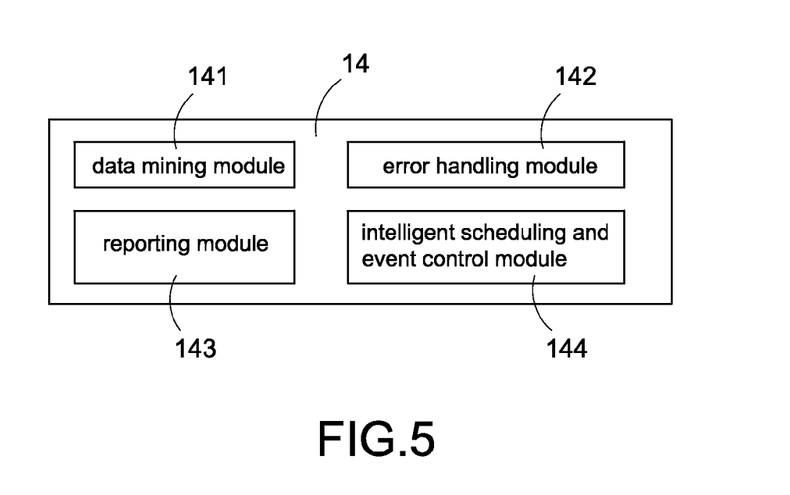
FIG. 5 illustrates a block diagram of a task execution module according to the first embodiment of the smart building management system of the present invention.

Please refer to FIG. 5, which illustrates a block diagram of the task execution module according to the first embodiment of the smart building management system of the present invention. As shown in FIG. 5, the task execution module 14 comprises a data mining module 141, an error handling module 142, a reporting module 143, and an intelligent scheduling and event control module 144 (hereinafter referred to the event control module 144). As aforesaid, the task execution module 14 has a plurality of execution procedures for different applications, so as to assist the building management sub-system 13 to execute different tasks. Accordingly, depending on the demands of the BMS 1, the amount and function of the modules 141-144 can be increased or reduced relatively.

The data mining module 141 connects with the database 17 in order to receive the requests from the building management sub-system 13, and collects corresponding data in the database 17 to further analyze the data, then replies an analyzed result to the building management sub-system 13. The data mining module 141 is configured to reply collected data only to a sub-system that issues a request. Alternatively, the data mining module 141 is configured to reply an analyzed result to a sub-system that issues a request after analyzing the collected data, but not limited thereto.

As an example, when the energy management sub-system 132 collects the operating timing of the hardware devices 41, the energy management sub-system 132 may send a request to the data mining module 141, so that the data mining module 141 may obtain corresponding data in the database 17 based on the request from the energy management sub-system 132.

The error handling module 142 records a plurality of processes for handling a plurality of errors, and eliminates the errors according to a corresponding process recorded therein while the hardware devices 41 are in abnormal operations or abnormal situations occurred.

It is worth to note that the hardware devices 41, the error handling module 142 and the building monitoring sub-system 135 are connected with each other. When the building monitoring sub-system 135 determines that the hardware devices 41 are not working properly, the building monitoring sub-system 135 not only issues a warning message, but also requests the error handling module 142 to perform the error eliminations according to the corresponding processes. Further, the error handling module 142 connects with the hardware devices 41 as well, so the error handling module 142 may actively sense and automatically perform the error eliminations when the hardware devices 41 are in the abnormal operations. Hence, the error handling module 142 may not need the requests from the building monitoring sub-system 135, and can reduce damage to users as possible as it can when the hardware devices 41 are out of order.

The reporting module 143 connects with the building management sub-system 13 and receives the requests of the building management sub-system 13 in order to generate corresponding reports, wherein the reports are displayed by the graphic user interface 11. More specifically, only when a user account having an authority limit of checking report logs in the BMS 1, the reports produced by the reporting module 143 will be shown on the graphic user interface 11 for the user to check.

For the embodiment, the energy management sub-system 132 analyzes the energy consumption and the loading statuses of the hardware devices 41, and gathers the statistics of the total energy consumption of the building 2, then the reporting module 143 generates the corresponding reports according to the above results, and the reports will be shown on the graphic user interface 11. The reporting module 143 can produce the report corresponding to the maintenance statuses of the hardware devices 41, which is analyzed by the maintenance management sub-system 133, and the report is shown on the graphic user interface 11. The reporting module 143 can also produce report corresponding to the user request statistics gathered by the QoS management sub-system 134 and the progress and quality of the service provided by the BMS 1 (which is analyzed by the QoS management sub-system 134), and the reports are shown on the graphic user interface 11.

The event control module 144 connects with the optimization sub-system 131 and receives the plural tasks planned by the optimization sub-system 131 of the energy-saving strategies. For the embodiment, the event control module 144 schedules the tasks, and executes the tasks according to the schedules. Hence general requests from the user can be processed and the hardware devices 41 are adjusted as well at the same time, so that the total energy consumption statuses of the building 2 may meet a preset energy-saving target. The event control module 144 is able to reply the execution results of the tasks to the optimization sub-system 131.

Please refer to FIG. 6, which illustrates a schematic view of a local area according to the first embodiment of the smart building management system of the present invention. The hardware unit of the BMS 1 yet comprises plural smart node devices 19 disposed in local areas 21 of the building 2. More specifically, each of the smart node devices 19 is in a single local area 21, such as a room, a meeting room, a restroom, etc., and directly controls the devices in the local area 21. The smart node device 19 connects with the building equipment control module 15 in order to reply the data of the devices in the local area 21 to the BMS 1.

As shown in FIG. 6, each local area 21 comprises at least one area sensing device 211 and at least one area application device 212. The smart node device 19 connects with the area sensing device 211 and the area application device 212 in the local area 21. The smart node device 19 collects and analyzes the environmental statuses, such as temperature, moisture, smoke concentration, etc. in the local area 21 through the area sensing device 211, and controls the area application devices 212, such as activating fans, dehumidifiers, air extractors, opening shutters, etc., according to the analyzed results.

It is worth to note that the smart node device 19 automatically can turn on and off the devices in the local area 21 according to realistic situations because of lower power consumption of the devices in the local area 21. The power consumption of the devices in the local area 21 may not affect the total energy consumption of the building 2, so it is not a main factor to meet the energy-saving target. Further, although the user can log in the BMS 1 to ask for a request, such as complaining an area being too hot, but the BMS 1 may consider for the building 2 as a whole to determine whether the HAVC system is regulated. Under the situation, the user's requirement in the building 2 may not be timely met. So, for not affecting the total energy consumption of the building 2 and for achieving comfort environment in time, the devices in the local area 21 are directly controlled by the smart node device 19.

As shown in FIG. 6, the amount of the smart node devices 19 is corresponding to the amount of the local areas 21. For the embodiment, each smart node device 19 has a single point/multi-point routing function, and the plural smart node devices 19 connect with each other to form a mesh network. Therefore, each smart node device 19 can transmit the environmental statuses, analyzing results, or control results to the building equipment control module 15. Moreover, the aforesaid information can be transmitted to another smart node device 19, and then to the building equipment control module 15 through another smart node device 19, but not limited thereto.

Figure 7:
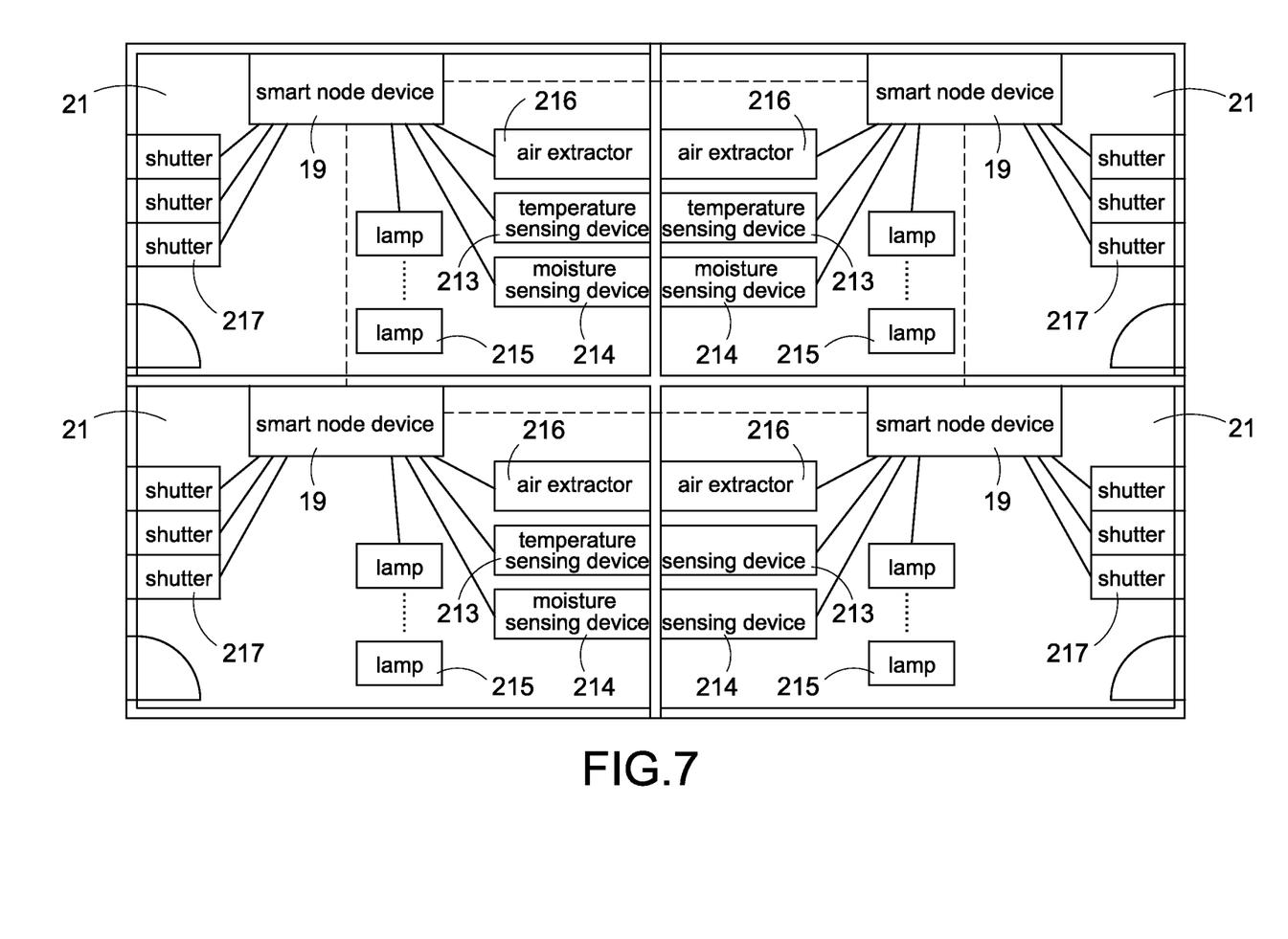
FIG. 7 illustrates a schematic view of a local area according to the second embodiment of the smart building management system of the present invention.

Please refer to FIG. 7, which illustrates a schematic view of a local area according to the second embodiment of the smart building management system of the present invention. As shown in FIG. 7, the area sensing device 211 comprises a temperature sensing device 213, a moisture sensing device 214, a heat sensing device (not shown in figure), an infrared ray sensing device (not shown in figure), etc. The area application device 212 comprises a lamp 215, an air conditioner or a split type air conditioner (not shown in figure), a fan (not shown in figure), an air extractor 216, a shutter 217, etc. The smart node device 19 mainly connects with the devices 213-217 and controls the devices 213-217.

The smart node devices 19 connect with each other in order to transmit environmental statuses of different local areas where the smart node devices 19 respectively are. Further, the smart node devices 19 can transmit control commands to each other, hence the smart node devices 19 are able to control the area application devices 212, and some local areas 21 may create similar or the same environments, such as same temperature, moisture, illumination, etc.

For another embodiment, the smart node devices 19 are not limited to be located in a single local area 21, but are used to control the same kind of devices which are not directly controlled by the system core module 10. For instance, if the air conditioners around the building 2 are not directly controlled by the system core module 10, through the smart node devices 19, the air conditioners of the building 2 can be managed. Through the characteristic of mutual communication in the smart node devices 19, those air conditioners are able to execute the same functions; therefore, the areas with the air conditioners create the same environmental atmosphere based on users' requests.

As shown in FIG. 1, the BMS 1 can connect with other BMSs 1 via the inter-building communication module 16. Hence, data and energy-saving strategies among the plural BMSs 1 are transmitted to each other. For the embodiment, the other BMSs 1 are used to manage other buildings 2, respectively.

Figure 8:
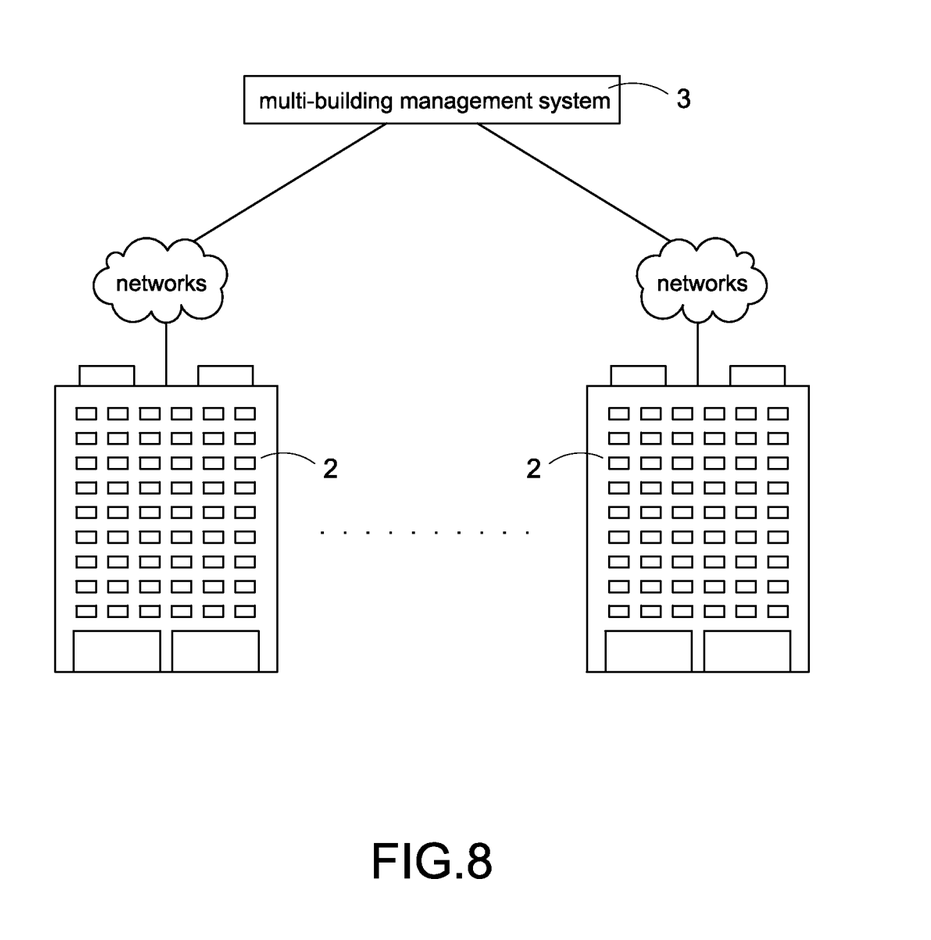
FIG. 8 illustrates a schematic structural view according to the first embodiment of the smart multi-building management system of the present invention.

Please refer to FIG. 8, which illustrates a schematic structural view according to a first embodiment of the smart multi-building management system of the present invention. The plural buildings 2/BMSs 1 connect with each other through networks, and yet connect with a multi-building management system 3 (hereinafter referred to the MBMS 3). For the embodiment, the MBMS 3 is mainly disposed in any building, or in a cloud system, and manages all of the BMSs 1 through networks.

For the embodiment, the hierarchy of the MBMS 3 is higher than that of the BMSs 1. For example, the MBMS 3 plans a co-management strategy according to a user with a position of group president, and transmits the co-management strategy to the BMSs 1. As a result, each of the BMSs 1 planning the energy-saving strategy shall follow the co-management strategy, and the co-management strategy cannot be violated. For instance, if the co-management strategy sets that the HVAC system only operates 8 hours in one day, for the energy-saving strategy planned by the BMSs 1, a task of the HVAC system operating more than 8 hours in one day must not exist.

Figure 9:
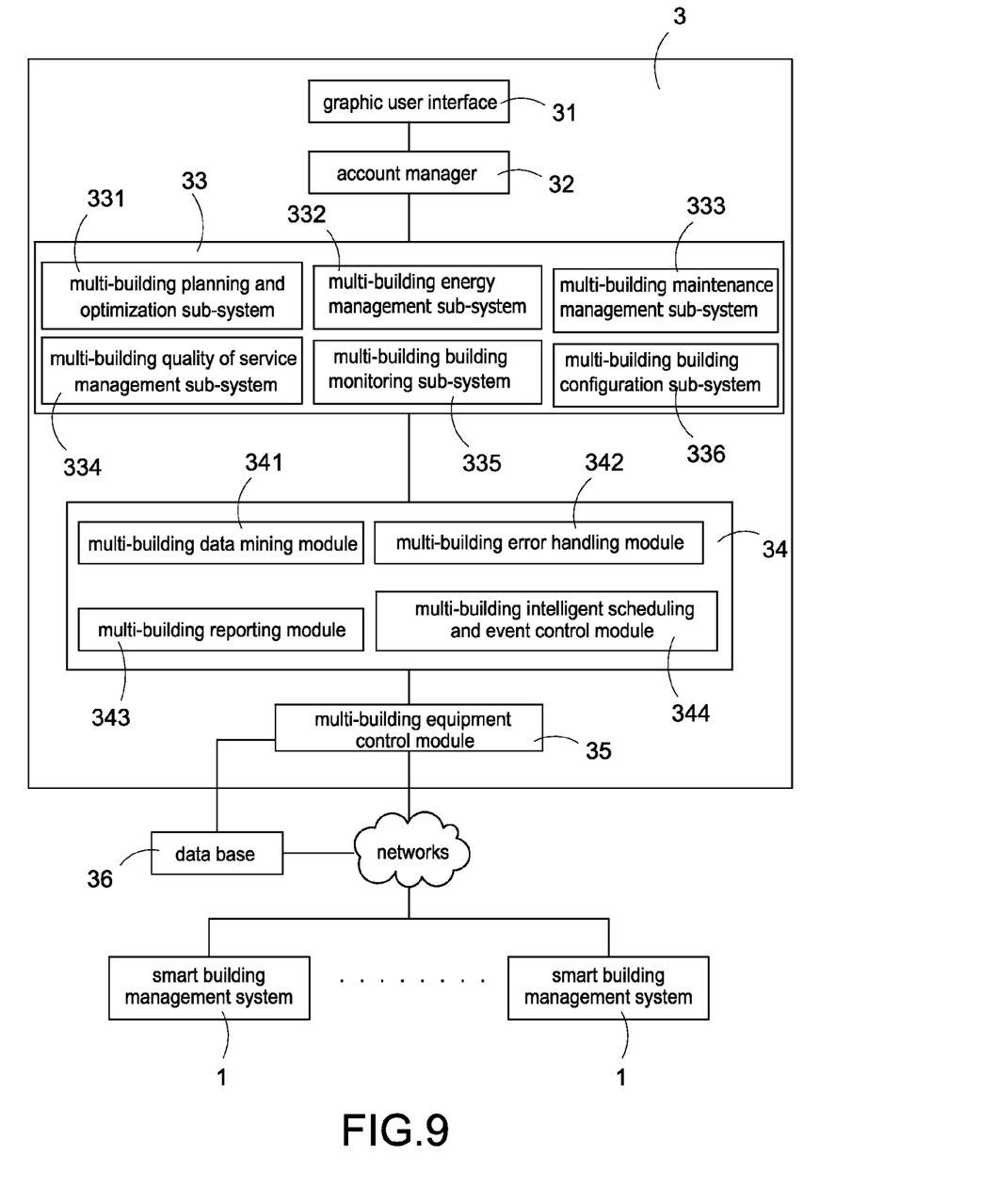
FIG. 9 illustrates a block diagram of the multi-building management sub-system according to the first embodiment of the smart building management system of the present invention.

Please refer to FIG. 9, which illustrates a block diagram according to the multi-building management sub-system of the first embodiment of the smart building management system of the present invention. As shown in figures, the structure of the MBMS 3 is similar to the BMS 1, and the MBMS 3 is to manage one or more BMSs 1, and is not to directly manage the buildings 2. Therefore, the MBMS 3 indirectly connects with any of the hardware devices 41 in the buildings 2.

As shown in FIG. 9, the MBMS 3 comprises a graphic user interface 31, an account manager 32, a multi-building management sub-system 33, a multi-building task execution module 34, a multi-building equipment control module 35, and a database 36.

The graphic user interface 31 receives login of a user of the MBMS 3 (such as the general manager of the plural buildings 2) with a user account. For the user account, the corresponding functions and data are provided to the authority limit of the user account. The account manager 32 connects with the graphic user interface 31 in order to manage one or more user accounts, and sets corresponding authority limits to the one or more user accounts based on the statuses of one or more users.

The multi-building equipment control module 35 connects with the plural BMSs 1 via networks in order to obtain the data and the statuses of the devices replied by the hardware devices 41 in the building 2. The database 36 connects with the multi-building equipment control module 35 or the plural BMSs 1 via networks, so as to store the data and the statuses of the devices replied by the hardware devices 41.

For the embodiment, the plural BMSs 1 are able to directly write the data, the statuses of the hardware devices 41 into the database 36 through networks; or the plural BMSs 1 firstly transmit the data, the statuses of the hardware devices 41 to the MBMS 3 for processing and analyzing, then the MBMS 3 writes the analyzed data, statuses, into the database 36. Specifically, when the MBMS 3 wants to obtain other data of the plural buildings 2, the BMSs 1 may transmit the data to the MBMS 3 through any of the aforesaid ways; wherein the other data of the plural buildings 2 are, for example, the energy consumption of the plural buildings 2 and the maintenance statuses of the hardware devices 41 of the plural buildings 2.

As shown in FIG. 9, the multi-building management sub-system 33 comprises a multi-building planning and optimization sub-system 331 (hereinafter referred to the multi-building optimization sub-system 331), a multi-building energy management sub-system 332, a multi-building maintenance management sub-system 333, a multi-building quality of service management sub-system 334 (hereinafter referred to the multi-building QoS management sub-system 334), a multi-building monitoring sub-system 335, and a multi-building configuration sub-system 336.

The multi-building energy management sub-system 332 connects with the database 36, and collects the operating timing of the hardware devices 41 in the database 36, and further analyzes the energy consumption and loading statuses of the hardware devices 41 in order to gather the statistics of the total energy consumption statuses of the buildings 2, then the analyzed and statistical results are stored in the database 36 and are displayed by the graphic user interface 31.

The multi-building maintenance management sub-system 333 connects with the database 36, and collects the down time data, the maintenance time, the maintenance flow charts of the plural hardware devices 41, and data and equipment statuses replied by the hardware devices 41 so as to analyze the maintenance statuses of the hardware devices 41 and to store the analyzing results in the database 36; further, the analyzing results are displayed by the graphic user interface 31 when the maintenance is needed.

The multi-building QoS management sub-system 334 connects with the database 36, and gathers the statistics of the requests stored in the databases 17 and 36 from the users of the plural buildings 2, and analyzes the progress and the quality of services for the requests, wherein the services are provided by the plural smart building management systems 1; further, the analyzed results are stored in the database 36 and are displayed by the graphic user interface 31.

It is worth to note that the plural BMSs 1 respectively store the related data of the plural buildings 2 in the database 36, hence the multi-building management system 3 can access the database 36 for following operations. The MBMS 3 may refer to the data in the database 36 to respectively evaluate key performance indicators (hereinafter referred to KPI) to the plural buildings 2, and make a comparison for the KPIs.

More specifically, the MBMS 3 is able to perform a default KPI evaluation, such as evaluation of production per unit and total energy consumption, or a user defined KPI evaluation. The default KPI evaluation comprises power density, sales electricity consumption per unit, sales carbon emissions per unit, sales greenhouse gas emissions per unit, energy use intensity, etc., but not limited thereto. Via the above evaluations, the users of the MBMS 3 can easily distinguish energy consumption differences from the plural buildings 2 in order to facilitate subsequent processes. For example, choosing a building 2 with a best energy-saving performance, issuing an improvement notice to a building 2 with a less energy-saving performance, etc.

The multi-building optimization sub-system 331 connects with the multi-building energy management sub-system 332, the multi-building maintenance management sub-system 333, and the multi-building QoS management sub-system 334, and plans at least one co-management strategy according to the users' requests, the maintenance statuses of the hardware devices 41, and the total energy consumption statuses of the plural buildings 2. The MBMS 3 stores the at least one co-management strategy in the database 36 and transmits to each of the plural BMSs 1, hence the plural BMSs 1 may respectively plan energy-saving strategies based on the co-management strategies.

For the embodiment, the plural BMSs 1 respectively have the optimization sub-systems 131, and each of the optimization sub-systems 131 plans the energy-saving strategy of the local end according to their optimization result. After each of the plural BMSs 1 respectively planning their own energy-saving strategy and receiving the co-management strategies, each of the plural BMSs 1 may execute the tasks only in the co-management strategy or execute the tasks only in their own energy-saving strategy based on realistic situations (for example, the authority limit of users), else, each of the plural BMSs 1 can also simultaneously execute the tasks in the co-management strategy and their own energy-saving strategy after integrating the co-management strategy and their own energy-saving strategy. However, the above descriptions are preferred embodiments of the present invention, but not limited thereto.

The multi-building configuration sub-system 336 connects with the database 36 in order to record and manage the amounts, sorts, the installment positions of the hardware devices 41 in the plural buildings 2, etc. The users are able to use the graphic user interface 31 to trigger the functions of the multi-building configuration sub-system 336 and to register new hardware devices 41 or to modify the data of old hardware devices 41. After registration and modification, the multi-building configuration sub-system 336 stores the above configuration data in the plural databases 17. It is worth to note that the multi-building configuration sub-system 336 directly stores the above configuration data in the plural databases 17 of the plural BMSs 1. Therefore the users may be no more to log in the plural BMSs 1, and trigger and use the building configuration sub-systems 136, and register for the hardware devices 41 of the plural buildings 2. Else, if the users register the hardware devices 41 in the plural buildings 2 through the BMSs 1 directly, the plural configured BMSs 1 automatically and respectively update the registered data to the MBMS 3 and/or the database 36.

The multi-building monitoring sub-system 335 connects with the multi-building configuration sub-system 336 and the database 36 in order to monitor the hardware devices 41 of the plural buildings 2. The monitoring results are stored in the database 36 by the multi-building monitoring sub-system 335, and the multi-building monitoring sub-system 335 issues warning messages when the hardware devices 41 do not work properly. For the embodiment, the multi-building monitoring sub-system 335 may issue the warning messages in the MBMS 3, and transmit the warning messages to the buildings 2 where the hardware devices 41 are not working properly, then each of the plural BMSs 1 of the plural buildings 2 may issue an alert to inform a related personnel for troubleshooting. For general embodiments, when the plural hardware devices 41 are out of order, the local plural BMSs 1 are responsible to monitor and issue alerts. The multi-building monitoring sub-system 335 only receives the alerts issued by the local plural BMSs 1 and is a role to be notified. In other words, the monitoring action executed by the multi-building monitoring sub-system 335 is for double check, but the main monitoring action is executed by the local BMSs 1.

The multi-building task execution module 34 connects with the above plural sub-systems 331-336, and connects with the database 36 through the multi-building equipment control module 35. As shown in FIG. 9, the multi-building task execution module 34 comprises a multi-building data mining module 341, a multi-building error handling module 342, a multi-building reporting module 343, and a multi-building intelligent scheduling and event control module 344 (hereinafter referred to the multi-building control module 344), but not limited thereto.

The multi-building data mining module 341 receives the requests of the sub-systems 331-336 in order to search and analyze corresponding data in the database 36, and replies the collecting and/or analyzing results to the sub-systems 331-336 that provide requests.

The multi-building error handling module 342 records a plurality of processes of a plurality of error statuses, and informs the multi-building monitoring sub-system 335, and further proceeds error eliminations according to corresponding processes when the hardware devices 41 in the plural buildings 2 are out of order. Similar to the above co-management strategy, if the plural BMSs 1 obtain a corresponding processes A through the error handling module 142, and the plural BMSs 1 yet receive a process B provided by the MBMS 3, the plural BMSs 1 may choose the process A, the process B, or the integration of the process A and the process B to engage in error eliminations depending on realistic situations, such as the authority limits of users.

The multi-building control module 344 schedules the plural tasks of the co-management strategy, and executes the tasks based on the schedules. The execution results will be replied to the multi-building optimization sub-system 331 by the multi-building control module 344. It is worth to note that the scheduled tasks by the optimization sub-systems 131 of the plural BMSs 1 only affect the buildings 2 respectively. For the embodiment, when the multi-building control module 344 executes the tasks of the co-management strategy, the plural connected buildings 2 may then be affected. As aforesaid, the plural BMSs 1 receive the co-management strategy, the local energy-saving strategy may not be deleted. That is, the co-management strategy and the local energy-saving strategy are jointly stored in the plural BMSs 1. After communications of the plural BMSs 1 and the MBMS 3, how to execute the co-management strategy and the local energy-saving strategy may be determined.

The present invention yet has one or more spare BMSs 1, and the spare BMSs 1 can be in cloud servers, but not limited thereto. When a BMS 1 of a building 2 is failed, the MBMS 3 may decide a spare BMS 1 to replace the failed BMS 1 in order to let the building 2 work properly in time.

For instance, if a management system A manages a building A and the management system A is failed because of some unknown factors, the MBMS 3 may immediately choose a spare management system B from a cloud server to replace the failed management system A and to simultaneously connect with a network involving the failed management system A, so as to take over the building A. Therefore, it minimizes the loss brought by the failed management system A.

The multi-building reporting module 343 receives the requests of the sub-systems 331-336 in order to obtain corresponding data in the database 36 or to receive analyzed statistical results provided by the sub-systems 331-336 for generating corresponding reports. The multi-building reporting module 343 makes the reports be displayed by the graphic user interface 31 for users in the MBMS 3 to check.

The present invention provides the smart BMS 1 to manage a single building 2, and the smart BMS 1 offers some useful strategies to the building 2 as well. When a user wants to set an energy-saving target of the building 2, the smart BMS 1 determines whether the energy-saving target is achieved according to the maintenance statuses of the hardware devices of the building 2 and the requests of the user. If the energy-saving target is not achieved, the user will be notified, and the user can reset a new energy-saving target. an new energy-saving target will be recommended by system if needed. The MBMS 3 simultaneously manages the plural smart BMSs 1 in order to manage the plural buildings 2 according to a same base. Therefore, the upper manager can easily and simultaneously manage the plural buildings 2.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A smart building management system (1) for managing a building (2), comprising:
    a graphic user interface (11), receiving requests from a user in an authority limit of a user account, and providing functions and data of the authority limit;
    an account manager (12), connecting with the graphic user interface (11), managing the user account registered by the user, and setting the authority limit of the user account;
    a building equipment control module (15), connecting with a plurality of hardware devices (41) through an industrial control system (ICS) (4) in the building (2) in order to be a connecting interface between the smart building management system (1) and the plurality of hardware devices (41);
    a building management sub-system (13), connecting with the graphic user interface (11) and the building equipment control module (15), receiving data and equipment statuses replied by the hardware devices (41), analyzing maintenance statuses of the hardware devices (41) and a total energy consumption of the building (2), and displaying on the graphic user interface (11), the building management sub-system (13) comprising:
    an energy management sub-system (132), collecting operating timing of the hardware devices (41), and analyzing the energy consumption and loading statuses in order to gather statistics of the total energy consumption statuses of the building (2);
    a maintenance management sub-system (133), collecting down time data, maintenance time, and maintenance flow charts of the hardware devices (41), receiving the data and the equipment statuses replied by the hardware devices (41) so as to analyze maintenance statuses of the hardware devices (41) and send a notice when maintenance is needed;
    a quality of service management sub-system (134), gathering statistics of the requests from the user, and analyzing an achieved percentage and quality of a service provided by the smart building management system (1) for the requests;
    a planning and optimization sub-system (131), connecting with the energy management sub-system (132), the maintenance management sub-system (133) and the quality of service management sub-system (134), the planning and optimization sub-system (131) executing optimization of the smart building management system (1) according to the requests of the user, the maintenance statuses of the hardware devices (41), and the total energy consumption of the building (2), and planning an energy-saving strategy, wherein the energy-saving strategy comprises the plurality of tasks that are executed by a task execution module (14); and
    a building configuration sub-system (136), connecting with the planning and optimization sub-system (131), recording and managing an amount and a sort of the hardware devices (41), and an installment position of the hardware devices (41) in the building (2);
    a task execution module (14), connecting with the building management sub-system (13) and the building equipment control module (15), making schedules to a plurality of tasks established by the building management sub-system (13) and executing the plurality of tasks according to the schedules; and
    a database (17), connecting with the building equipment control module (15) and the hardware devices (41), storing the data and the equipment statuses replied by the hardware devices (41), and being accessed by the building management sub-system (13) and the task execution module (14) through the building equipment control module (15),
    wherein an analyzing result of the quality of service management sub-system (134) is stored in the database (17) and displayed by the graphic user interface (11), and the building management sub-system (13) establishes the plurality of tasks based on the maintenance statuses of the hardware devices (41) and the requests from the user, and the task execution module (14) executes the tasks to adjust the hardware devices (41), so that the total energy consumption of the building (2) meets an energy-saving target set by the user.

2. The smart building management system (1) according to claim 1, wherein the energy-saving strategy comprises a hardware replacing strategy and a software analyze strategy, the hardware replacing strategy comprising estimating a cost to replace the hardware devices (41) and estimating an energy-saving benefit brought by replacing the hardware devices (41), the software analyze strategy comprising analyzing using statuses of energy according to history data of the hardware devices (41) in order to provide a software improvement proposal and estimate a cost to the software improvement proposal and an energy-saving benefit brought by the software improvement proposal.

3. The smart building management system (1) according to claim 1, wherein the building management sub-system (13) further comprises a building monitoring sub-system (135), connecting with the planning and optimization sub-system (131) and the building configuration sub-system (136), monitoring operating statuses of the hardware devices (41), and issuing a warning message when abnormal operations are occurred.

4. The smart building management system (1) according to claim 3, wherein the building monitoring sub-system (135) connects with the maintenance management sub-system (133) and provides the operating statuses of the hardware devices (41) to the maintenance management sub-system (133), the maintenance management sub-system (133) issuing a maintenance message in time when the hardware devices (41) are the in abnormal operations.

5. The smart building management system (1) according to claim 1, wherein the task execution module (14) comprises:
  a data mining module (141), receiving requests of the building management sub-system (13) in order to search and analyze corresponding data in the database (17), and replying an analyzed result to the building management sub-system (13);
  an error handling module (142), recording a plurality of processes of a plurality of error statuses, and eliminating errors according to corresponding processes while the hardware devices (41) are in abnormal operations;
  an intelligent scheduling and event control module (144), making schedules to the tasks planned by the planning and optimization sub-system (131), executing the plurality of tasks according to the schedules, and replying execution results to the planning and optimization sub-system (131); and
  a reporting module (143), receiving the requests of the building management sub-system (13) in order to generate corresponding reports, wherein the reports are displayed by the graphic user interface (11).

6. The smart building management system (1) according to claim 1, further comprising a field access control agent (18), connecting with the hardware devices (41) and the building equipment control module (15) in order to be an agent interface of the building equipment control module (15) for communicating with the industrial control system (4) that has the hardware devices (41).

7. The smart building management system (1) according to claim 6, further comprising a smart node device (19), connecting with the building equipment control module (15), the smart node device (19) being in a local area (21) of the building (2), and connecting with an area sensing device (211) and an area application device (212) of the local area (21), the smart node device (19) searching and analyzing environmental statuses of the local area (21) through the area sensing device (211), and controlling the area application device (212) according to an analyzing result.

8. The smart building management system (1) according to claim 7, wherein the area sensing device (211) comprises at least one of a temperature sensing device (213), a moisture sensing device (214), a heat sensing device, and an infrared ray sensing device, the area application device (212) comprising at least one of a lamp (215), an air conditioner, a fan, an air extractor (216), and a shutter (217).

9. The smart building management system (1) according to claim 7, wherein there are a plurality of smart node devices (19), each smart node device (19) being in a corresponding local area (21) of the building (2), the smart node devices (19) connecting with each other, each of the smart node devices (19) transmitting the environmental statuses of the corresponding local area (21) and the analyzed result to the building equipment control module (15) or to the other smart node device (19), and the other smart node device (19) transmitting to the building equipment control module (15).

10. The smart building management system (1) according to claim 1, further comprising an inter-building communication module (16), connecting with the other smart building management system (1), wherein the other smart building management system (1) manages the other building (2).

11. The smart building management system (1) according to claim 10, wherein the inter-building communication module (16) connects with a multi-building management system (3), the multi-building management system (3) simultaneously managing the smart building management system (1) and the other smart building management system (1), the multi-building management system (3) planning at least one co-management strategy, wherein the planning and optimization sub-system (131) plans the energy-saving strategy based on the co-management strategy.

12. A smart building management system (1) for managing a building (2), comprising:
  a graphic user interface (11), receiving requests from a user in an authority limit of a user account, and providing functions and data of the authority limit;
  an account manager (12), connecting with the graphic user interface (11), managing the user account registered by the user, and setting the authority limit of the user account;
  a building equipment control module (15), connecting with a plurality of hardware devices (41) in the building (2) to be a connecting interface among the smart building management system (1) and the plurality of hardware devices (41), wherein each of the plurality of hardware devices (41) being in each of areas of the building (2);
  a database (17), connecting with the building equipment control module (15) and the hardware devices (41), storing data and equipment statuses replied by the hardware devices (41);
  an energy management sub-system (132), connecting with the database (17), collecting operating timing of the hardware devices (41) of each of the areas in the database (17), and analyzing energy consumption and loading statuses of the hardware devices (41) in order to gather statistics of total energy consumption statuses of the building (2), an analyzing and statistical result being stored in the database (17) and being displayed by the graphic user interface (11);
  a maintenance management sub-system (133), connecting with the database (17), collecting down time data, maintenance time, maintenance flow charts of the hardware devices 41, and data and equipment statuses replied by the hardware devices (41) in the database (17) so as to analyze maintenance statuses of the hardware devices (41) and to store an analyzing result in the database (17), an analyzing result of the maintenance management sub-system (133) being displayed by the graphic user interface (11) for maintenance;

a quality of service management sub-system (134), connecting with the database (17), gathering statistics of the requests provided by the user, and analyzing an achieved percentage and quality of a service for the requests, wherein the service is provided by the smart building management system (1), an analyzing result of the quality of service management sub-system (134) being stored in the database (17) and being displayed by the graphic user interface (11);

a building configuration sub-system (136), connecting with the database (17), letting the user record and manage an amount, sorts, installment positions of the hardware devices (41) in the building (2), and then storing in the database (17);

a building monitoring sub-system (135), connecting with the building configuration sub-system (136) and the database (17), monitoring whether the hardware devices (41) are in normal operations, a monitoring result being stored in the database (17), and issuing a warning message when the hardware devices (41) are in abnormal operations;

a planning and optimization sub-system (131), connecting with the energy management sub-system (132), the maintenance management sub-system (133), and the quality of service management sub-system (134), the planning and optimization sub-system (131) executing optimization of the smart building management system (1) according to the requests of the user, the maintenance statuses of the hardware devices (41), and a total energy consumption of the building (2), and planning at least one energy-saving strategy;

wherein the smart building management system (1) manages and adjusts the hardware devices (41) in the building (2) based on the energy-saving strategy in order to let the total energy consumption meet an energy-saving target set by the user.

13. The smart building management system (1) according to claim 12, further comprising a task execution module (14), connecting with the energy management sub-system (132), the maintenance management sub-system (133), the quality of service management sub-system (134), the planning and optimization sub-system (131), the building monitoring sub-system (135), and the building configuration sub-system (136), the task execution module (14) connecting with the database (17) via the building equipment control module (15) and comprising:

a data mining module (141), receiving requests of the sub-systems in order to search and analyze corresponding data in the database (17), and replying an analyzed result to the sub-systems that provide requests;

an error handling module (142), recording a plurality of processes of a plurality of error statuses, and eliminating errors according to corresponding processes when the hardware devices (41) are in abnormal operations;

an intelligent scheduling and event control module (144), making schedules to a plurality of tasks included in the energy-saving strategy, executing the plurality of tasks according to the schedules, and replying execution results to the planning and optimization sub-system (131); and a reporting module (143), receiving the requests of the sub-systems in order to generate corresponding reports, wherein the reports are displayed by the graphic user interface (11).

14. The smart building management system (1) according to claim 13 further comprising a field access control agent (18), connecting with the hardware devices (41) and the building equipment control module (15) in order to represent the building equipment control module (15) and communicate with the hardware devices (41).

15. The smart building management system (1) according to claim 13, further comprising a smart node device (19), connecting with the building equipment control module (15), the smart node device (19) being in a local area (21) of the building (2), and connecting with an area sensing device (211) and an area application device (212) of the local area (21), the smart node device (19) searching and analyzing environmental statuses of the local area (21) through the area sensing device (211), and controlling the area application device (212) according to an analyzed result.

16. A multi-building management system (3), connecting with a plurality of smart building management systems (1) via a network, wherein the smart building management systems (1) manage different buildings (2), the multi-building management system (3) comprising:

a graphic user interface (31), receiving requests from a user in an authority limit of a user account, and providing functions and data of the authority limit;

an account manager (32), connecting with the graphic user interface (31), managing the user account registered by the user, and setting the authority limit of the user account;

a multi-building equipment control module (35), connecting with the plurality of smart building management systems (1), receiving data and equipment statuses replied by a plurality of hardware devices (41) in the buildings (2);

a database (36), connecting with the multi-building equipment control module (35) and the plurality of smart building management systems (1), storing the data and the equipment statuses replied by the hardware devices (41);

an multi-building energy management sub-system (332), connecting with the database (36), collecting operating timing of the hardware devices (41) in the database (36), and analyzing the energy consumption and loading statuses of the hardware devices (41) in order to gather statistics of total energy consumption statuses of the buildings (2), analyzed and statistical results being stored in the database (36) and being displayed by the graphic user interface (31);

a multi-building maintenance management sub-system (333), connecting with the database (36), collecting down time data, maintenance time, maintenance flow charts of the hardware devices 41, and data and equipment statuses replied by the hardware devices (41) in the database (36) so as to analyze maintenance statuses of the hardware devices (41) and to store analyzed results in the database (36), the analyzed results of the multi-building maintenance management sub-system (333) being displayed by the graphic user interface (31) for maintenance;

a multi-building quality of service management sub-system (334), connecting with the database (36), respectively gathering statistics of the requests from the users of the buildings (2), and analyzing a progress and quality of services for the requests, wherein the services are provided by the plural smart building management systems (1), analyzed results of the multi-building quality of service management sub-system (334) being stored in the database (36) and being displayed by the graphic user interface (31);

a multi-building configuration sub-system (336), connecting with the database (36), letting the user record and manage amounts, sorts, installment positions of the hardware devices (41) in the plural buildings (2), and then storing in the database (36);

a multi-building monitoring sub-system (335), connecting with the building configuration sub-system (336) and the database (36), monitoring whether the hardware devices (41) are in normal operations, monitoring results being stored in the database (36), and issuing warning messages when the hardware devices (41) are in abnormal operations; and a multi-building planning and optimization sub-system (331), connecting with the multi-building energy management sub-system (332), the multi-building maintenance management sub-system (333), and the multi-building quality of service management sub-system (334), the multi-building planning and optimization sub-system (331) planning at least one co-managing strategy according to the requests of the users of the plural smart building management systems (1), the maintenance statuses of the hardware devices (41), and total energy consumptions of the buildings (2), and transmitting to the plural smart building management systems (1);

wherein the plural smart building systems (1) respectively use the co-managing strategy to be as a planning base of an energy-saving strategy.

17. The smart building management system (1) according to claim 16, further comprising a multi-building task execution module (34), connecting with the multi-building energy management sub-system (332), the multi-building maintenance management sub-system (333), the multi-building quality of service management sub-system (334), the multi-building planning and optimization sub-system (331), the multi-building building monitoring sub-system (335), and the multi-building building configuration sub-system (336), the multi-building task execution module (34) connecting with the database (36) via the multi-building equipment control module (35) and comprising:

a multi-building data mining module (341), receiving requests of the sub-systems in order to search and analyze corresponding data in the database (36), and replying analyzed results to the sub-systems that provide requests;

a multi-building error handling module (342), recording a plurality of processes of a plurality of error statuses, informing the multi-building monitoring sub-system (335) and eliminating errors according to corresponding processes when the hardware devices (41) in the plural buildings (2) are in the abnormal operations;

a multi-building intelligent scheduling and event control module (344), making schedules to a plurality of tasks included in the co-managing strategy, executing the plurality of tasks according to the schedules, and replying execution results to the planning and optimization sub-system (331); and a multi-building reporting module (343), receiving the requests of the sub-systems in order to generate corresponding reports, wherein the reports are displayed by the graphic user interface (31).

\* \* \* \* \*